(12) United States Patent
Wong

(10) Patent No.: US 7,673,418 B2
(45) Date of Patent: Mar. 9, 2010

(54) IRRIGATION SYSTEM

(75) Inventor: Kam Hoi Wong, Hong Kong (HK)

(73) Assignee: City Greening Engineering Co. Ltd., Hong Kong (HK)

( * ) Notice: Subject to any disclaimer, the term of this patent is extended or adjusted under 35 U.S.C. 154(b) by 548 days.

(21) Appl. No.: 11/411,410

(22) Filed: Apr. 25, 2006

(65) Prior Publication Data

US 2007/0028520 A1 Feb. 8, 2007

(30) Foreign Application Priority Data

Apr. 26, 2005 (GB) .................................. 0508406.6

(51) Int. Cl.
*A01G 25/00* (2006.01)

(52) U.S. Cl. .............................................. 47/80; 47/79
(58) Field of Classification Search ................ 47/59 R, 47/79–82, 62 R, 62 E, 62 C, 63
See application file for complete search history.

(56) References Cited

U.S. PATENT DOCUMENTS

| | | | |
|---|---|---|---|
| 2,445,717 A * | 7/1948 | Richards | 47/80 |
| 3,686,792 A * | 8/1972 | Barfield | 47/39 |
| 3,747,399 A * | 7/1973 | Treirat | 73/73 |
| 4,001,968 A * | 1/1977 | Green | 47/80 |
| 5,020,275 A * | 6/1991 | Bednarzik | 47/79 |
| 5,189,835 A * | 3/1993 | Green | 47/80 |
| 6,276,090 B1 | 8/2001 | Lai | |
| 6,363,658 B1 | 4/2002 | Lai | |
| 6,622,430 B1 | 9/2003 | Lai | |
| 2004/0035466 A1 | 2/2004 | Oretti | |

FOREIGN PATENT DOCUMENTS

| | | |
|---|---|---|
| GB | 2095083 A | 9/1982 |
| GB | 0508406.6 | 7/2005 |
| GB | 2425449 B | 5/2007 |
| JP | 11192031 A | 7/1999 |

* cited by examiner

*Primary Examiner*—Rob Swiatek
*Assistant Examiner*—Kristen C Hayes
(74) *Attorney, Agent, or Firm*—Daniel Schein, Esq.

(57) ABSTRACT

A horticultural irrigation system comprising a plant growth container. The plant growth container comprises a receptacle for a plant growth medium, a reservoir, a container inlet, a float valve and an outlet means. The container inlet supplies water to the reservoir. The float valve is adapted to close the container inlet when the water in the reservoir reaches a pre-determined level. An outlet means allows the passage of water from the reservoir to the receptacle.

4 Claims, 3 Drawing Sheets

IRRIGATION SYSTEM

This invention relates to a horticultural irrigation system particularly but not exclusively for potted plants or plants in other growth containers. The invention may also find use for irrigation of plants in growing beds or lawns.

Known irrigation systems such as sprinklers or diffusion systems which are connected directly to a mains water supply are able to provide a constant supply of water to a growth container. However such systems are not responsive to the amount of water within the container. For example water may continue to be provided to a container which has been flooded by a rainstorm or by over watering.

According to a first aspect of the present invention the horticultural irrigation system comprises a plant growth container comprising a receptacle for a plant growth medium, a reservoir, a container inlet for supply of water to the reservoir, a float valve adapted to close the container inlet when the water in the reservoir reaches a pre-determined level and outlet means for allowing passage of water from the reservoir to the receptacle, and further comprising a supply controller comprising a controllable mains inlet valve adapted for connection in use to a mains water supply, a pressure regulator adapted to close the mains inlet valve when water pressure in the controller reaches a predetermined value, one or more outlets each outlet being coupled to a dispenser inlet in a plant growth container, the plant growth container comprising a receptacle for a plant growth medium, a reservoir, a container inlet for supply of water from the supply controller to the reservoir, a float valve adapted to close the container inlet when the water in the reservoir reaches a predetermined level, and outlet means for allowing passage of water from the reservoir to the receptacle, wherein the pressure regulator comprises an expandable member adapted to expand in response to an increase in water pressure in the controller and an actuator connected to the expandable member, the actuator being adapted to close the inlet valve when the pressure reaches a predetermined value.

In a first preferred aspect of the present invention the side wall of the container incorporates a chamber for holding a supply of water, the inlet communicating between the chamber and the reservoir. This may serve as a stand-alone pot or container so that connection to a water supply is not required.

Preferably the expandable member is a diaphragm. Alternatively, a bellows or piston arrangement may be used.

Plant growth medium may be disposed in a container, for example a plant pot, tub or trough. Alternatively the plant growth medium may comprise a lawn or bed, for example a flower or vegetable bed which may be located outside or in a greenhouse, cloche or cold frame.

In the event that a receptacle is flooded, for example by a rain storm, the float valve in the container prevents any further supply of water to the growth medium until the level of water in the container has fallen below the predetermined value. In this way excessive watering or drying out is prevented.

In preferred embodiments the receptacle and float valve are integral with a container, for example located at the bottom of a plant pot, tub or trough so that water released from the valve can permeate the growth medium at the bottom of the container.

The outlet means may comprise an aperture communicating with the receptacle.

In a preferred embodiment the outlet means comprises a porous or permeable body adapted to provide a slow release of water from the reservoir to the receptacle. The porous or permeable body may comprise a porous ceramic, fibrous or open celled foam member or an array of small apertures or pores dimensioned to permit slow release of water from the reservoir to the growth medium.

Use of system in accordance with this invention confers several advantages. Several growth containers or beds may be located at different levels both above and below the level of the supply controller, the amount of water supplied to each container being controlled by the float valve. The pressure in the system may be controlled and adjusted by the linkage to the diaphragm or by adjusting the sensitivity of the diaphragm to water pressure. For example a restraining member may be used to reduce the flexible area of the diaphragm, reducing the sensitivity of the device to water pressure.

The predetermined pressure within the system may be selected so that the water is supplied to each container but that excessive pressures are avoided. Excessive pressure caused by direct connection to the mains supply is avoided. Application of full mains water pressure to the system is undesirable as this may lead to dislocation of the connecting pipes or leaks from the valves. In addition a high water pressure may make closure of the valves difficult, leading to a lack of sensitivity of the apparatus. Furthermore a more robust and expensive construction is necessary to reliably handle the higher water pressures of a mains water supply.

Several containers or dispensers, for example six or more may be connected to a single supply regulator.

In an alternative embodiment of the invention the plant growth medium comprises a bed, for example a flower border, vegetable bed or an indoor bed such as in a greenhouse, cloche or cold frame. The supply regulator may deliver water to several locations with a bed.

Figure 1:
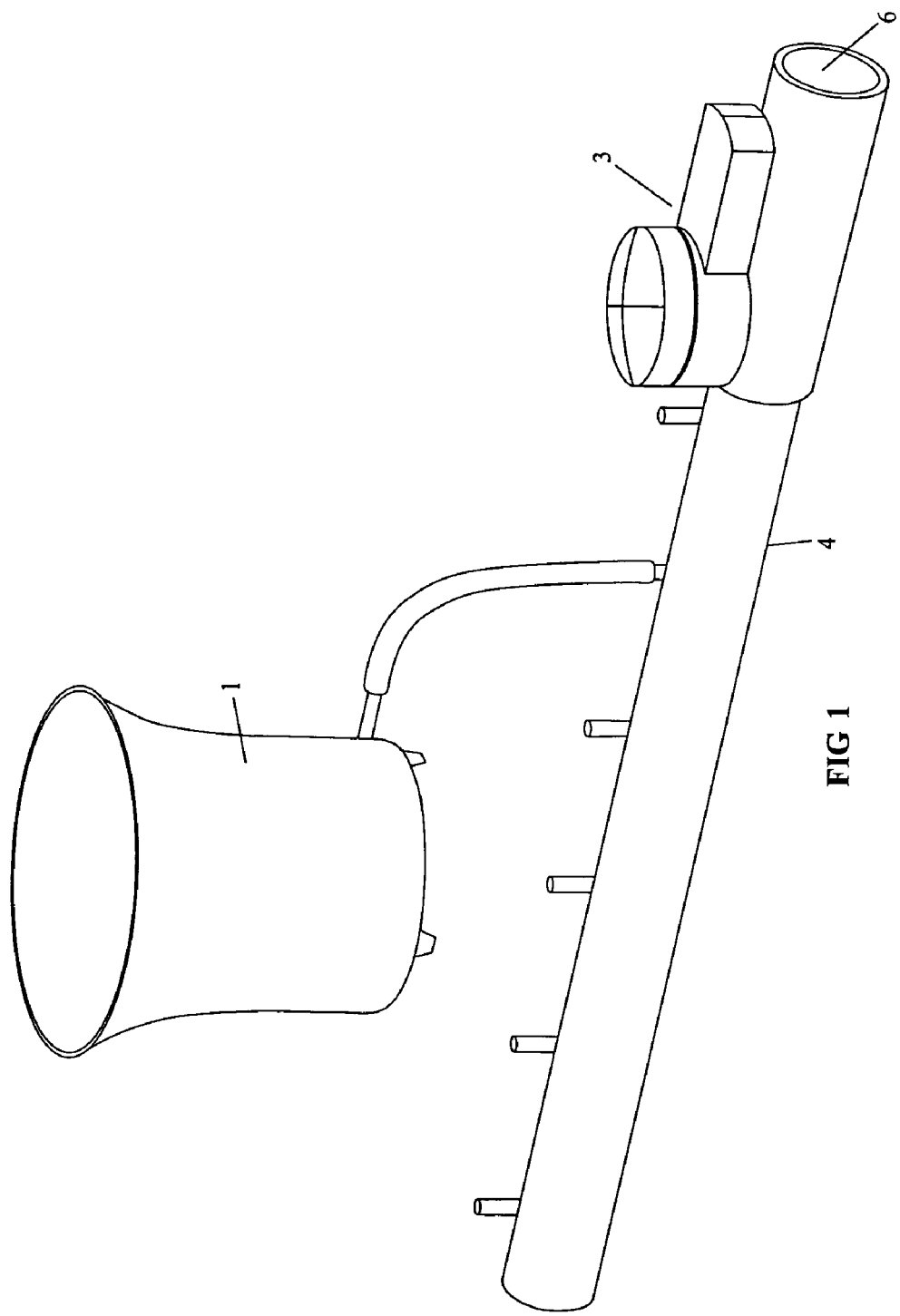
FIG. 1 is a perspective view of system in accordance with this invention.
Figure 2:
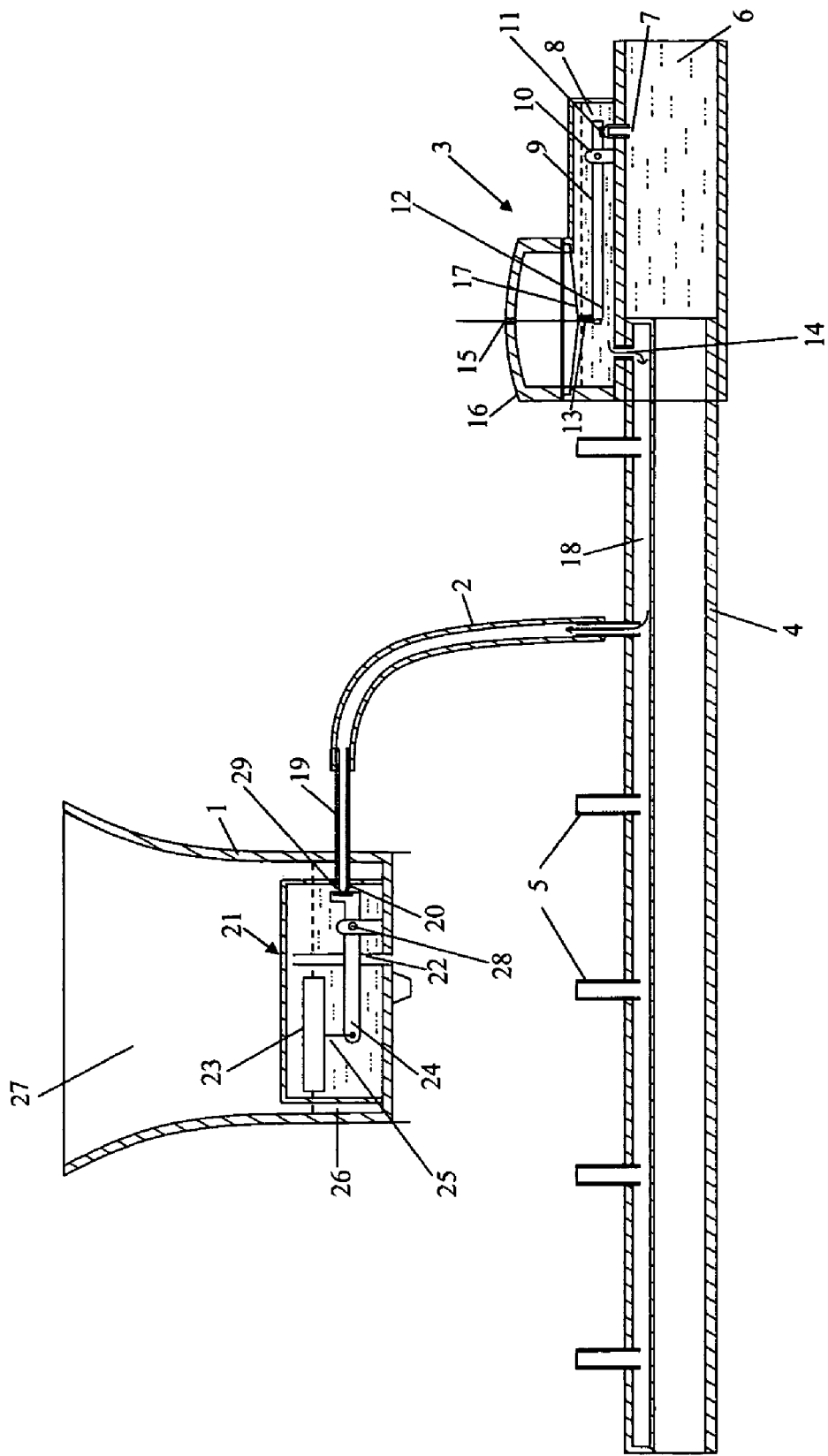
FIG. 2 is a cross-sectional view through the system shown in FIG. 1.

The system shown in FIGS. 1 and 2 comprises a plant growth container (1) in the form of a plant pot connected by means of a flexible pipe (2) to a supply controller (3) having an outlet pipe (4). Several, for example six outlet pipes (5) may each be connected to a respective tube (2) and container (1). A water inlet (6) having a connector (not shown) for connection to a mains water supply and inlet tube (7) has an outlet opening into chamber (8). A lever (9) is connected to pivot (10) which incorporates a valve seat (11) which co-operates with the inlet tube (7) to form a valve preventing flow of water from the water inlet (6) into the system. The remote end (12) of lever (9) is connected by a linkage (13) to a diaphragm (17) located within a domed enclosure (16) having an air vent (15). Pressure of water within the chamber (8) urges the diaphragm (17) upwardly raising the remote end (12) of the lever (9) and closing the valve member (11) against the inlet tube (7).

The flexibility of the diaphragm (17) may be adjusted so that the valve is closed in response to a predetermined water pressure within the system. Alternatively the linkage (13) may be adjusted in length to arrange the pre-determined water pressure. Water in the chamber (8) passes out through an aperture (14) along the conduit (18) to the outlet tubes (5). Each outlet tube (5) is either connected to a container (1) or sealed to prevent leakage. The container (1) has an inlet tube (19) extending through the wall of the container and through an aperture in the wall (20) of a reservoir chamber (21). A float valve comprising a float (23) which is connected by a linkage (25) to an end (24) of a lever which is connected to pivot (28) is present within the reservoir chamber (21). A valve seat (29) co-operates with the end (19) of tube (18) to close the inlet to the reservoir chamber (21) preventing entry of water. The height of the float (23) may be adjusted so that the valve is closed when a pre-determined level of water is within the reservoir chamber (21). The wall of the reservoir chamber (21) includes a porous or permeable portion permitting diffusion of water container into the base (26) of the container (1). Alternatively an aperture may be provided. For example the reservoir may be free standing or loosely secured to the underlying container base to allow passage of water from the reservoir chamber to the growing medium. Growing medium is placed in the portion (27) of the container (1) and is moistened by the water in the lower part of the container (1). An overflow (22) provides an air vent and prevents overfilling of the reservoir chamber (21).

In use of the system, the diaphragm (17) is adjusted so that a sufficient pressure of water within the system is obtained to irrigate the containers (1) whether they are located on the same level as the supply controller or above or below it. The float valve in each container permits sufficient water to pass to maintain a desired level within the reservoir chamber (21) providing a constant measured supply of water to the growing medium in the container (1). However, in the event that the container (1) is flooded, diffusion of water into the reservoir chamber (21) maintains the float valve in a closed position preventing further ingress of water.

Figure 3:
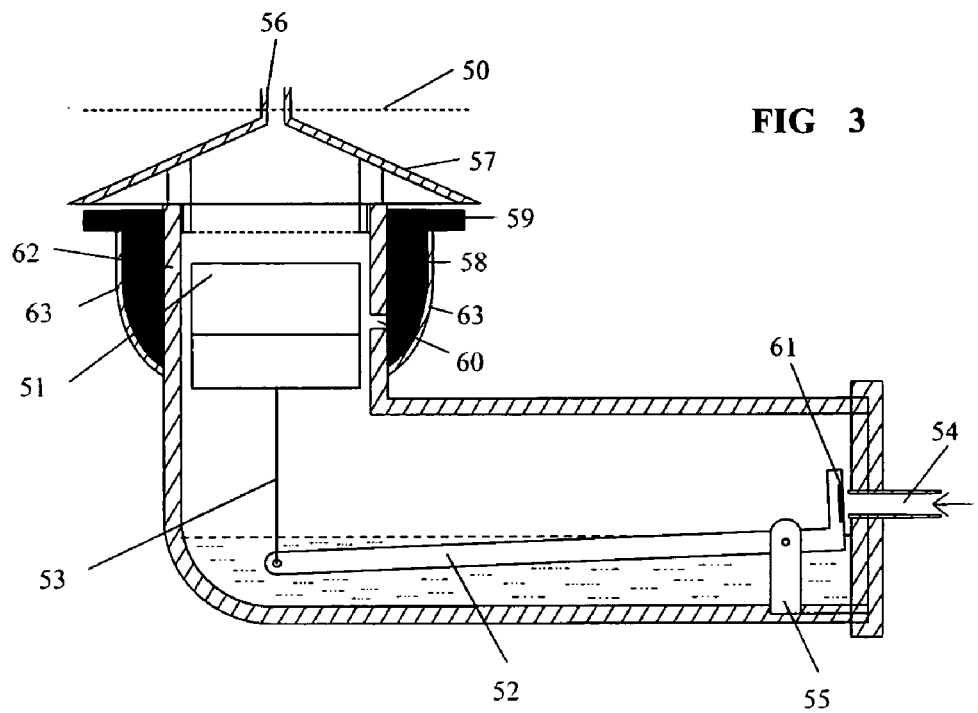
FIGS. 3 and 4 are cross-sectional views through a further alternative system in accordance with this invention.
Figure 4:
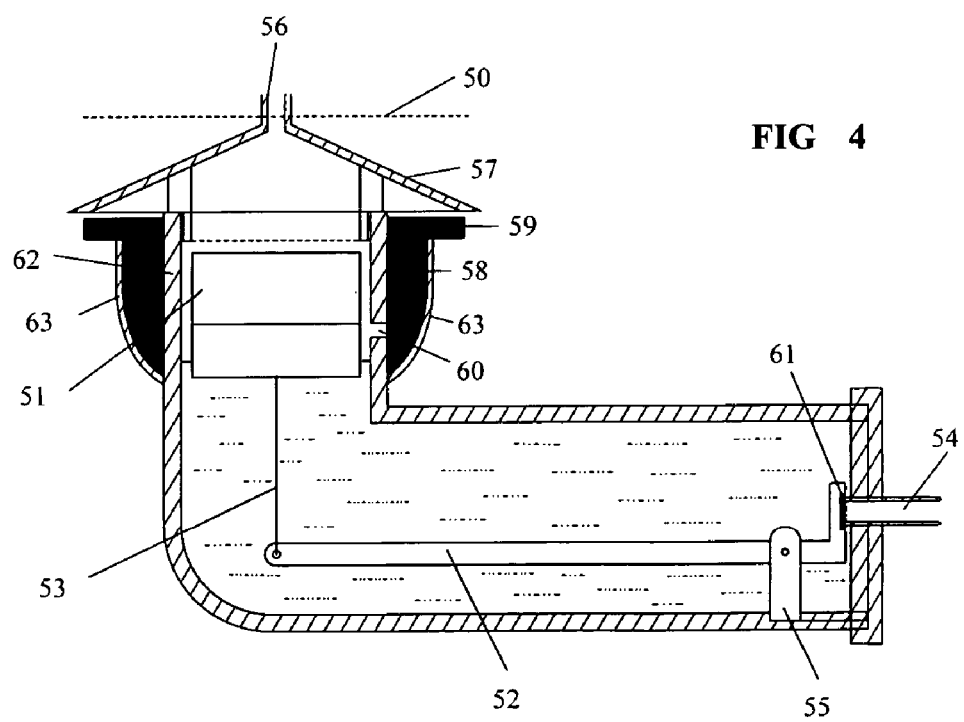

FIGS. 3 and 4 show a further embodiment of the invention which may be located in a flower or vegetable bed or beneath the ground level (50) of a lawn. The system comprises a float (51) connected to lever (52) by a linkage (53). The lever (52) is mounted on a pivot (55) and has a valve seat surface (61) which is arranged to co-operate with the inlet tube (54) to form a constant head float valve as described in the previous embodiments. The water supply may be provided by a supply controller as shown in FIGS. 1 and 2 or the system may be directly connected to a water supply. An outlet (60) permits a steady flow of water from the chamber into a porous medium, for example a sponge or open cell foam (58) in an annular support (63) surrounding the upright portion (62) of the system. The foam extends radially outwardly at an upper portion (59) permitting an even distribution of water in the surrounding soil. A cover (57) and air vent (56) prevent soil from entering the float chamber. The linkage (53) is adjusted so that the water level when the valve is closed communicates with outlet (60), permitting a small but steady flow of water into the porous medium (58).

The invention claimed is:

1. A horticultural irrigation system comprising:
   a plurality of plant growth containers, each said plant growth container comprising a single receptacle for a plant growth medium, a reservoir fixed within said receptacle, said reservoir comprising a housing having at least one housing wall, a container inlet for supply of water to said reservoir, a float valve within said reservoir housing adapted to close said container inlet when the water in said reservoir reaches a first pre-determined level and an outlet means for allowing passage of water from said reservoir to said receptacle, said outlet means for allowing passage of water from said reservoir to said receptacle comprising an aperture in said at least one housing wall or at least one of said at least one housing wall being porous or permeable to water, wherein water passing from said aperture in said housing wall or via said porous or permeable housing wall will come into direct contact with growth medium placed in said receptacle without any intervening wall between said at least one housing wall, wherein a growth medium placed within said receptacle so that said growth medium is in direct contact with said fixed reservoir can be provided with a first pre-determined level of water, said first pre-determined level of water being controlled by said float valve within said reservoir wherein the receptacle for holding the growth medium stays fixed with respect to said reservoir while the level of water supplied to said receptacle is determined by said float valve within said reservoir; further comprising:
   a supply controller comprising a controllable main inlet valve adapted for connection in use to a main water supply,
   a pressure regulator adapted to close said main inlet valve when water pressure in said controller reaches a predetermined value,
   at least one outlet, one of said at least one outlet being coupled to said container inlet in said plant growth container, wherein said container inlet supplies water from said supply controller to said reservoir,
   wherein said pressure regulator comprises an expandable member adapted to expand in response to an increase in water pressure in the controller and an actuator connected to said expandable member, said actuator being adapted to close said inlet valve when the pressure reaches a predetermined value, wherein said plant growth container can be placed above said supply controller and said reservoir can be filled to the first pre-determined level and said plant growth container can be placed below or at the same level as said supply controller and said reservoir can be filled to the first pre-determined level.

2. A horticultural irrigation system as claimed in claim 1 in which at least one of said plurality of plant growth containers is located above the level of said supply controller.

3. A horticultural irrigation system as claimed in claim 2 in which said expandable member is a diaphragm.

4. A horticultural irrigation system as claimed in claim 3, in which when said reservoir housing has a porous or permeable wall, said porous or permeable wall comprises at least one material selected from the group consisting of porous ceramic, fibrous and open celled foam materials.

* * * * *